United States Patent
Washiro

(10) Patent No.: US 10,515,239 B2
(45) Date of Patent: Dec. 24, 2019

(54) TRANSMISSION DEVICE AND TRANSMISSION SYSTEM

(71) Applicant: eNFC Inc., Minato-ku, Tokyo (JP)

(72) Inventor: Takanori Washiro, Tokyo (JP)

(73) Assignee: eNFC Inc., Minato-ku, Tokyo (JP)

( * ) Notice: Subject to any disclaimer, the term of this patent is extended or adjusted under 35 U.S.C. 154(b) by 0 days.

(21) Appl. No.: 16/098,871

(22) PCT Filed: Dec. 13, 2016

(86) PCT No.: PCT/JP2016/087073
§ 371 (c)(1),
(2) Date: Nov. 5, 2018

(87) PCT Pub. No.: WO2017/199458
PCT Pub. Date: Nov. 23, 2017

(65) Prior Publication Data
US 2019/0188424 A1 Jun. 20, 2019

(30) Foreign Application Priority Data
May 17, 2016 (JP) .................................. 2016-098819

(51) Int. Cl.
*G06K 7/08* (2006.01)
*G06K 7/10* (2006.01)
(Continued)

(52) U.S. Cl.
CPC ............... *G06K 7/087* (2013.01); *G06K 7/10* (2013.01); *G06K 7/10316* (2013.01);
(Continued)

(58) Field of Classification Search
CPC ......... G06K 19/00; G06K 19/06; G06K 19/07
(Continued)

(56) References Cited

U.S. PATENT DOCUMENTS 8,797,148 B2 * 8/2014 Kato ................. G06K 19/07749
340/10.51
2011/0090058 A1 * 4/2011 Ikemoto .................... H01Q 5/35
340/10.1
(Continued)

FOREIGN PATENT DOCUMENTS

JP 2003216911 A 7/2003
JP 2006324774 A 11/2006
(Continued)

OTHER PUBLICATIONS

Aug. 30, 2016, Notification of Reasons for Refusal issued by the Japan Patent Office in the corresponding Japanese Patent Application No. 2016-098819.
(Continued)

*Primary Examiner* — Edwyn Labaze
(74) *Attorney, Agent, or Firm* — Kenja IP Law PC

(57) ABSTRACT

A transmission device includes a magnetic field antenna and an electric field antenna connected electrically to the magnetic field antenna. When the magnetic field antenna is at a position allowing reception of a magnetic field signal transmitted by another magnetic field antenna included in a magnetic field transmission device, the transmission device becomes capable of transmitting an electric field signal generated on the basis of the magnetic field signal. The electric field antenna is grounded by being connected electrically to a ground to which the magnetic field transmission device is connected.

4 Claims, 12 Drawing Sheets

(51) Int. Cl.
  *H04B 1/3877* (2015.01)
  *H04B 1/59* (2006.01)
  *H04B 5/02* (2006.01)
  *H04B 13/00* (2006.01)

(52) U.S. Cl.
  CPC ............. *H04B 1/3877* (2013.01); *H04B 1/59* (2013.01); *H04B 5/02* (2013.01); *H04B 13/00* (2013.01)

(58) Field of Classification Search
  USPC .......................................... 235/492, 375, 487
  See application file for complete search history.

(56) References Cited

U.S. PATENT DOCUMENTS

2014/0213184 A1  7/2014  Matsubara
2015/0116168 A1  4/2015  Yosui

FOREIGN PATENT DOCUMENTS

JP   2009081771 A   4/2009
JP   2013148954 A   8/2013
WO   2014030317 A1  2/2014

OTHER PUBLICATIONS

Jan. 24, 2017, International Search Report issued in the International Patent Application No. PCT/JP2016/087073.
Nov. 20, 2018, International Preliminary Report on Patentability issued in the International Patent Application No. PCT/JP2016/087073.
Apr. 11, 2019, the partial supplementary European search report issued by the European Patent Office in the rresponding European Patent Application No. 16902476.7.
Jul. 16, 2019, the Extended European Search Report issued by the European Patent Office in the corresponding European Patent Application No. 16902476.7.

* cited by examiner

# TRANSMISSION DEVICE AND TRANSMISSION SYSTEM

CROSS-REFERENCE TO RELATED APPLICATION

The present application claims priority to and the benefit of Japanese Patent Application No. 2016-098819 filed May 17, 2016, the entire contents of which are incorporated herein by reference.

TECHNICAL FIELD

The present disclosure relates to a transmission device and a transmission system that can achieve both magnetic field communication using magnetic field signals and electric field communication using electric field signals.

BACKGROUND

Contactless systems (magnetic field communication systems) that use a contactless integrated circuit (IC) card are known. Such contactless systems are, for example, used as electronic tickets and electronic money. In a contactless communication system, an antenna included in the contactless IC card receives a magnetic field signal transmitted by a magnetic field antenna in a reader/writer (R/W) device and transmits predetermined information in response as a magnetic field signal to the R/W device. Communication is thus established between the contactless IC card and the R/W device. Patent literature (PTL) 1, for example, discloses an example of a contactless communication system.

A transmission system that uses a dielectric as a transmission medium to transmit a high-frequency signal or high-frequency power is also known. In particular, such a transmission system is referred to as a human body communication system, for example, when the dielectric is a human body. In the human body communication system, communication with a transmission device is established when the human body touches an electrode of the transmission device, whereas communication with the transmission device is not established when the human body is not touching an electrode of the transmission device. PTL 2 and PTL 3, for example, disclose examples of a human body communication system.

CITATION LIST

Patent Literature

PTL 1: JP2003216911A
PTL 2: JP2006324774A
PTL 3: JP2013148954A

SUMMARY

Technical Problem

Currently, transmission systems can also be used for authentication, billing, or the like carried out using a contactless communication system. Creating new infrastructure for the transmission system, however, presents a major cost. Furthermore, ceasing to use an existing contactless communication system yields an economic loss with respect to the cost for constructing the existing contactless communication system.

Moreover, if some users wished to use a contactless communication system whereas other users wished to use a transmission system such as a human body communication system, it would significantly increase costs to create two independent systems to satisfy both groups of customers.

In light of these considerations, the present disclosure aims to provide a transmission device and a transmission system capable of implementing both magnetic field communication and electric field communication.

Solution to Problem

To solve the above problem, a transmission device according to a first aspect includes:
a magnetic field antenna; and
an electric field antenna connected electrically to the magnetic field antenna;
such that when the magnetic field antenna is at a position allowing reception of a magnetic field signal transmitted by another magnetic field antenna included in a magnetic field transmission device, the transmission device becomes capable of transmitting an electric field signal generated on the basis of the magnetic field signal; and
such that the electric field antenna is grounded by being connected electrically to a ground to which the magnetic field transmission device is connected.

A transmission device according to a second aspect includes:
a magnetic field antenna;
an electric field antenna connected electrically to the magnetic field antenna; and
an electrode;
such that when the magnetic field antenna is at a position allowing reception of a magnetic field signal transmitted by another magnetic field antenna included in a magnetic field transmission device, the transmission device becomes capable of transmitting an electric field signal generated on the basis of the magnetic field signal; and
such that the electric field antenna is grounded by the electrode capacitively coupling to a ground to which the magnetic field transmission device is connected.

A transmission device according to a third aspect includes:
a magnetic field antenna; and
an electric field antenna connected electrically to the magnetic field antenna;
such that when the magnetic field antenna is at a position allowing reception of a magnetic field signal transmitted by another magnetic field antenna included in a magnetic field transmission device, the transmission device becomes capable of transmitting an electric field signal generated on the basis of the magnetic field signal; and
such that the electric field antenna is grounded by being connected electrically to a terminal line having an electrical length of $((2n+1) \times 90 \pm 45)°$, where n is an integer of at least 0, relative to the electric field signal.

In a transmission device according to a fourth aspect, the transmission device is configured to be attachable to and detachable from the magnetic field transmission device.

A transmission system according to a fifth aspect includes:
an electric field antenna connected electrically to a magnetic field antenna;
a magnetic field transmission device including a communication circuit, configured to control a signal to be transmitted, and another magnetic field antenna connected electrically to the communication circuit; and an electric field communication device including a transceiver unit configured to transmit and receive an electrical signal and a coupling electrode connected to the transceiver unit and configured to couple to a transmission medium;

such that the electric field communication device performs electric field communication through the transmission medium when the transmission medium is coupled to the electric field antenna and the coupling electrode while the magnetic field antenna is at a position allowing reception of a magnetic field signal transmitted by the another magnetic field antenna; and such that the electric field antenna is configured to be attachable to and detachable from the magnetic field transmission device.

In a transmission system according to a sixth aspect, the electric field communication device further includes:

an insertion portion allowing insertion of a magnetic field communication device including a magnetic field antenna; and a magnetic field antenna configured to receive a magnetic field signal transmitted by the magnetic field antenna of the magnetic field communication device.

In a transmission system according to a seventh aspect, the electric field communication device further includes another coupling electrode; and a length from the coupling electrode to an end of the transmission medium in a longitudinal direction is an electrical length in a range of $(2n \times 90 \pm 45)°$, where n is an integer of at least 0, relative to the electrical signal, a length from the another coupling electrode to another end of the transmission medium in the longitudinal direction is an electrical length in a range of $((2n+1) \times 90 \pm 45)°$ relative to the electrical signal, and the electric field communication device performs the electric field communication by the electric field antenna coupling to a region of the transmission medium where the electrical length is in the range of $(2n \times 90 \pm 45)°$ relative to the electrical signal.

Other aims, features, and advantages of the present disclosure will become clear in the detailed description below, which is based on embodiments of the present disclosure and the attached drawings.

DETAILED DESCRIPTION

Embodiments of the present disclosure are described below in detail with reference to the drawings.

First Embodiment

Figure 1:
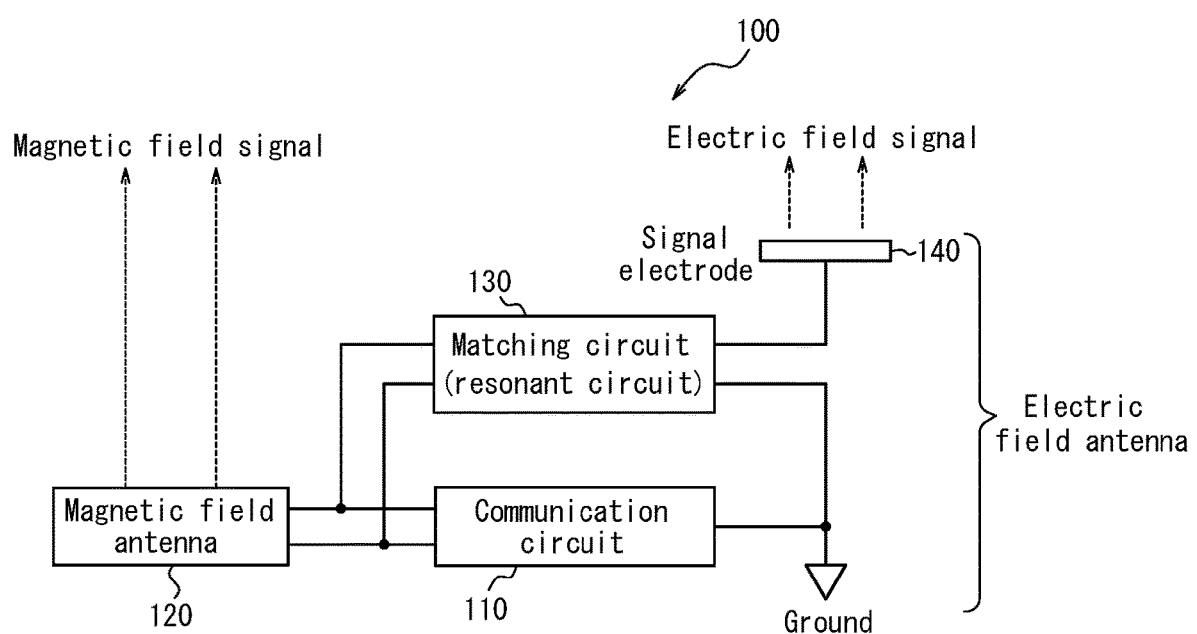
FIG. 1 is a functional block diagram illustrating the schematic configuration of a transmission device according to a first embodiment of the present disclosure.

FIG. 1 is a functional block diagram illustrating the schematic configuration of a transmission device 100 according to the first embodiment of the present disclosure. The transmission device 100 includes a communication circuit 110, a magnetic field antenna 120, a matching circuit (resonant circuit) 130, and a signal electrode 140. The transmission device 100 can use the magnetic field antenna 120 to communicate via magnetic field signals (magnetic field communication) with a magnetic field communication device constituted, for example, by a contactless IC card or the like. The transmission device 100 can also use the signal electrode 140 to communicate via electric field signals (electric field communication) with an electric field communication device coupled electrically through a transmission medium in contact with the signal electrode 140. The signal electrode 140 functions as a portion of an electric field antenna.

First, magnetic field communication by the transmission device 100 is described together with the functional blocks of the transmission device 100.

The communication circuit 110 controls the signals output from the magnetic field antenna 120 and the electric field antenna in the transmission device 100. During communication via magnetic field signals, the communication circuit 110 transmits a control signal to the magnetic field antenna 120 for causing the magnetic field antenna 120 to transmit a magnetic field signal of a predetermined frequency. The communication circuit 110 also performs information processing on the magnetic field signals received by the magnetic field antenna 120 from a magnetic field communication device such as a contactless IC card. The communication circuit 110 is connected to ground.

The magnetic field antenna 120 is connected to the communication circuit 110 and transmits a magnetic field signal of a predetermined frequency in accordance with the control signal from the communication circuit 110. The magnetic field antenna 120 is, for example, formed by a loop antenna. The magnetic field signal transmitted by the magnetic field antenna 120 is received by a magnetic field communication device (not illustrated). The magnetic field communication device includes an antenna capable of communicating with the transmission device 100 via magnetic field signals and an IC chip that stores predetermined information and controls the entire communication device. After receiving a magnetic field signal, the magnetic field communication device converts information inside the IC chip to a signal and transmits the signal from the antenna.

The magnetic field antenna 120 receives magnetic field signals from the magnetic field communication device.

When the magnetic field communication device, such as a contactless IC card, is placed within a range capable of receiving magnetic field signals transmitted by the magnetic field antenna 120, magnetic field communication via magnetic field signals is established between the transmission device 100 and the magnetic field communication device. The communication circuit 110 and the magnetic field antenna 120 thus function as the magnetic field transmission device (R/W device) in a known magnetic field communication system (contactless communication system).

Next, electric field communication by the transmission device 100 is described.

The matching circuit 130 is connected to the communication circuit 110. The matching circuit 130 is a circuit for matching the impedance of the communication circuit 110 and the impedance of the electric field communication device. The matching circuit 130 can, for example, be constituted by a known LC circuit combining a capacitor, an inductor, and the like. In the present embodiment, one terminal of the matching circuit 130 is connected to ground.

The signal electrode 140 is a coupling electrode that, during electric field communication, couples with a transmission medium constituted by a conductor, such as metal, or a dielectric. The signal electrode 140 is, for example, formed by a metal plate.

Figure 2:
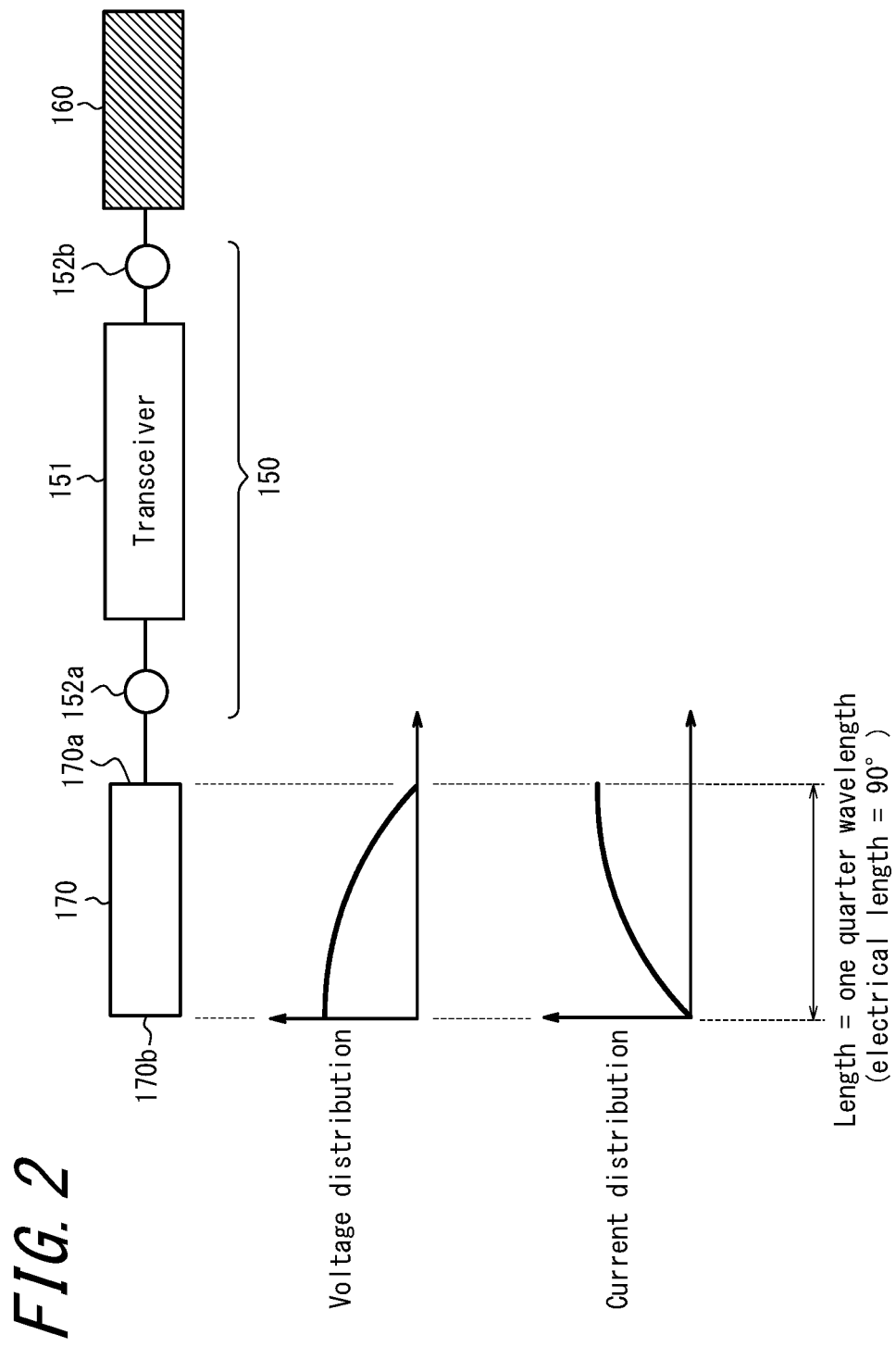
FIG. 2 illustrates an example of an electric field communication device.

FIG. 2 illustrates an example of an electric field communication device capable of electric field communication with the transmission device 100. The electric field communication device 150 includes two input/output (I/O) terminals 152a and 152b and a transceiver 151 connected to the two I/O terminals 152a and 152b. During communication with the transmission device 100, the transceiver 151 transmits and receives high-frequency signals (or high-frequency power) between 10 kHz and 10 GHz, for example. One of the I/O terminals of the electric field communication device 150, i.e. the I/O terminal 152a, is connected to ground or to a terminal line 170 that functions as a virtual ground. Details on the terminal line 170 are provided below. When the other I/O terminal 152b of the electric field communication device 150 is coupled electrically to the signal electrode 140 through a transmission medium, electric field communication is established between the transmission device 100 and the electric field communication device 150. The matching circuit 130 and the signal electrode 140 thus function as an electric field antenna.

As described above, the magnetic field antenna 120 and the electric field antenna (matching circuit 130 and signal electrode 140) are connected to one communication circuit 110 in the transmission device 100 according to the present embodiment. The transmission device 100 can therefore transmit signals with the same content (data) simultaneously from both the magnetic field antenna 120 and the electric field antenna. Consequently, the user can freely choose between magnetic field communication and electric field communication.

Furthermore, the transmission device 100 is configured by providing the communication circuit 110 and the magnetic field antenna 120, which function as the magnetic field transmission device in a known magnetic field communication system, with the matching circuit 130 and the signal electrode 140. The transmission device 100 can therefore be configured by constructing a transmission system based on electric field signals on top of an existing magnetic field communication system. In other words, the transmission device 100 is configured by using an existing magnetic field communication system and providing an electric field antenna for electric field communication. Consequently, the transmission device 100 allows a reduction in the cost for producing devices as compared to when newly constructing a device with both the functions of known magnetic field communication (contactless communication) and electric field communication. The transmission device 100 can also be used without the need to discard an existing magnetic field communication system.

The terminal line functioning as a virtual ground is now described with reference again to FIG. 2. As an example, the electric field communication device 150, a transmission medium 160, and the terminal line 170 are depicted in FIG. 2.

The electric field communication device 150 includes the two I/O terminals 152a and 152b and the transceiver 151. One of the I/O terminals, i.e. the I/O terminal 152b, is a terminal for electrically coupling to the transmission medium 160. The other I/O terminal 152a is coupled electrically to the terminal line 170 formed by a conductor, such as metal, or a dielectric. As an example, the transceiver 151 is described here as transmitting high-frequency signals.

When the transceiver 151 transmits a high-frequency signal by electric field communication with the transmission device 100, current flows to the terminal line 170 from the I/O terminal 152a of the transceiver 151 coupled to the terminal line 170. At the same time, current of the same magnitude as the current flowing to the terminal line 170 flows in the opposite direction from the I/O terminal 152b to the transmission medium 160. In this way, the transceiver 151 sends a high frequency signal to the transmission medium.

The terminal line 170 has an electrical length of 90°. An electrical length of 90° means that the length of the line from the end 170a connected to the I/O terminal 152a to the other end 170b is one quarter of the wavelength of the high frequency signal to be transmitted. In other words, the phase of the high frequency signal to be transmitted advances 90° over the length from the end 170a connected to the I/O terminal 152a to the other end 170b.

Consequently, the current that flows to the terminal line 170 side from the end 170a connected to the input/output terminal 152a is subsequently reflected at the other end 170b of the terminal line 170 and returns to the end 170a connected to the input/output terminal 152a, thereby traversing a distance of half a wavelength. The phase thus advances 180°.

Figure 3:
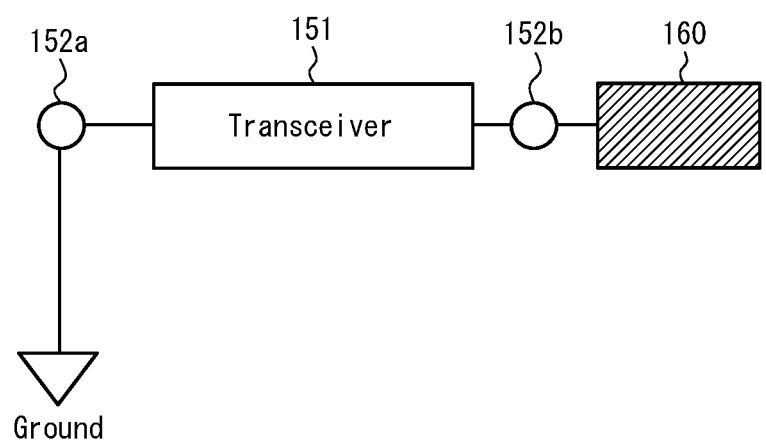
FIG. 3 schematically illustrates operation of the electric field communication device in FIG. 2.

At this time, as illustrated in FIG. 2, the transceiver 151 inputs a high frequency signal to the terminal line 170, which has an electrical length of 90°, i.e. one quarter of the wavelength of the high frequency signal to be transmitted, and the end 170b of which is open. Consequently, a standing wave is generated in the terminal line 170, with maximum voltage amplitude and zero current amplitude at the end 170b and zero voltage amplitude and maximum current amplitude at the end 170a, and current flows to the end 170a. In other words, when the terminal line 170 has an electrical length of 90°, the voltage amplitude at the end 170a is zero, but current flows. Hence, as illustrated schematically in FIG. 3, the end 170a behaves as though it were virtually short circuited to ground. The I/O terminal 152a connected to the terminal line 170 can thus be considered a short-circuit terminal that is virtually connected to ground.

As illustrated in FIG. 2, the current that flows into the I/O terminal 152a is maximized when the electrical length of the terminal line 170 is 90°, i.e. when the signal input from the end 170a of the terminal line 170 connected to the I/O terminal 152a of the transceiver 151 is reflected at the other end 170b and returns so that the phase of the reflected wave is 180°. Consequently, electric field communication is most efficient when the electrical length of the terminal line 170 is 90°. During electric field communication, however, a certain advantage in high frequency transmission is still obtained by the electrical length of the terminal line 170 being within a range of ±45° C. of 90° C., i.e. with the phase of the reflected wave being in a range greater than 90° C. and smaller than 270° C. It thus suffices for the terminal line 170 to have an electrical length of substantially 90°, which includes a range of ±45° C. from 90° C. The terminal line 170 may have an electrical length of $((2n+1)\times90\pm45)°$, where n is an integer of at least 0. When the terminal line 170 has an electrical length of $((2n+1)\times90\pm45)°$, the terminal line 170 functions as a virtual ground by the same principle as described with reference to FIG. 2.

Second Embodiment

Figure 4:
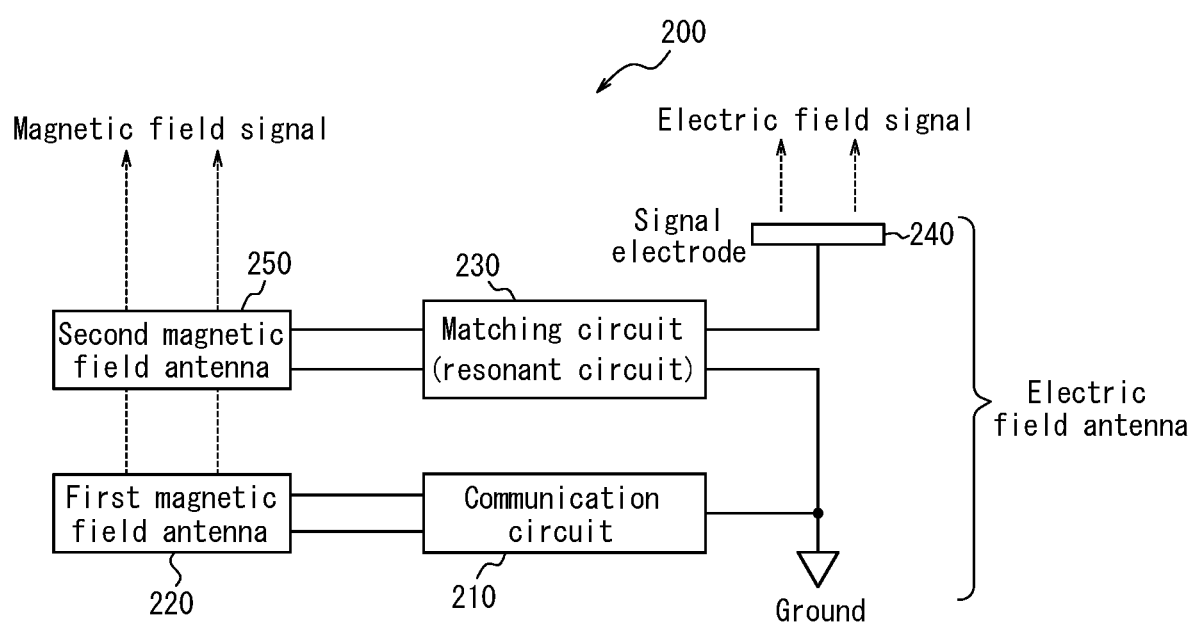
FIG. 4 is a functional block diagram illustrating the schematic configuration of a transmission device according to a second embodiment of the present disclosure.

FIG. 4 is a functional block diagram illustrating the schematic configuration of a transmission device 200 according to the second embodiment of the present disclosure. The transmission device 200 includes a communication circuit 210, a first magnetic field antenna 220, a matching circuit (resonant circuit) 230, a signal electrode 240, and a second magnetic field antenna 250. The transmission device 200 according to the present embodiment can perform magnetic field communication with a magnetic field communication device and electric field communication with an electric field communication device, like the transmission device 100 according to the first embodiment. A description of points similar to the transmission device 100 according to the first embodiment is omitted below as appropriate to focus mainly on the differences.

The transmission device 200 according to the present embodiment is substantially configured by two transmission devices. One of the transmission devices (first transmission device) is a magnetic field transmission device that includes the communication circuit 210 and the first magnetic field antenna 220. The first transmission device is, for example, an existing magnetic field transmission device. The other transmission device (second transmission device) includes the matching circuit 230, the signal electrode 240, and the second magnetic field antenna 250. The transmission device 200 according to the second embodiment is configured by combining the first transmission device and the second transmission device.

The communication circuit 210 according to the present embodiment corresponds to the communication circuit 110 of the first embodiment and controls signals output by the first magnetic field antenna 220. The communication circuit 210 is connected to ground. The first magnetic field antenna 220 corresponds to the magnetic field antenna 120 in the first embodiment and transmits a magnetic field signal of a predetermined frequency in accordance with a control signal from the communication circuit 210. The communication circuit 210 and the first magnetic field antenna 220 are, for example, known equipment (a magnetic field transmission device) for achieving magnetic field communication.

When a magnetic field communication device (not illustrated) is placed within a range capable of receiving magnetic field signals transmitted by the first magnetic field antenna 220, magnetic field communication is established between the transmission device 200 and the magnetic field communication device. In the present embodiment, the communication circuit 210 and the first magnetic field antenna 220 function as a magnetic field transmission device in a known magnetic field communication system.

In the present embodiment, the second magnetic field antenna 250 is arranged in a position allowing receipt of magnetic field signals transmitted by the first magnetic field antenna 220. The second magnetic field antenna 250 is connected to the matching circuit 230. When a magnetic field signal transmitted by the first magnetic field antenna 220 is received in the second magnetic field antenna 250, a control signal to be provided to the matching circuit 230 is generated in the second magnetic field antenna 250 on the basis of the received magnetic field signal. The control signal generated in the second magnetic field antenna 250 is provided to the matching circuit 230.

The functions of the matching circuit 230 and the signal electrode 240 in the present embodiment are similar to those of the matching circuit 130 and the signal electrode 140 in the first embodiment. The present embodiment differs from the first embodiment in that a signal from the second magnetic field antenna 250 is provided to the matching circuit 230.

In the present embodiment as well, electric field communication between the transmission device 200 and an electric field communication device is established when the signal electrode 240 is electrically coupled through a transmission medium to the electric field communication device. In other words, the matching circuit 230 and the signal electrode 240 function as an electric field antenna in the present embodiment.

In this way, the transmission device 200 according to the present embodiment as well can transmit signals with the same content (data) simultaneously from both the first magnetic field antenna 220 and the electric field antenna. Consequently, the user can freely choose between magnetic field communication and electric field communication.

Furthermore, even when the first transmission device that functions as a magnetic field transmission device is provided as existing equipment, for example, the transmission device 200 can be configured by providing the existing first transmission device with a new second transmission device. The transmission device 200 can thus be configured by using an existing magnetic field communication system and providing an electric field antenna for electric field communication. Consequently, the transmission device 200 allows a reduction in the cost for producing devices as compared to when newly constructing a device with both the functions of known magnetic field communication and electric field communication. The transmission device 200 can also be used without the need to discard an existing magnetic field communication system. Furthermore, no wiring work for connecting the communication circuit 210 and the matching circuit 230 to existing equipment is required in the present embodiment, making it easier to provide existing equipment with an electric field antenna. When the outer case of the first transmission device, which is existing equipment, is made from grounded metal or the like, then a ground connection is also easy to make, and the transmission device 200 can be configured by attaching the second transmission device to the outside of the existing equipment.

Third Embodiment

Figure 5:
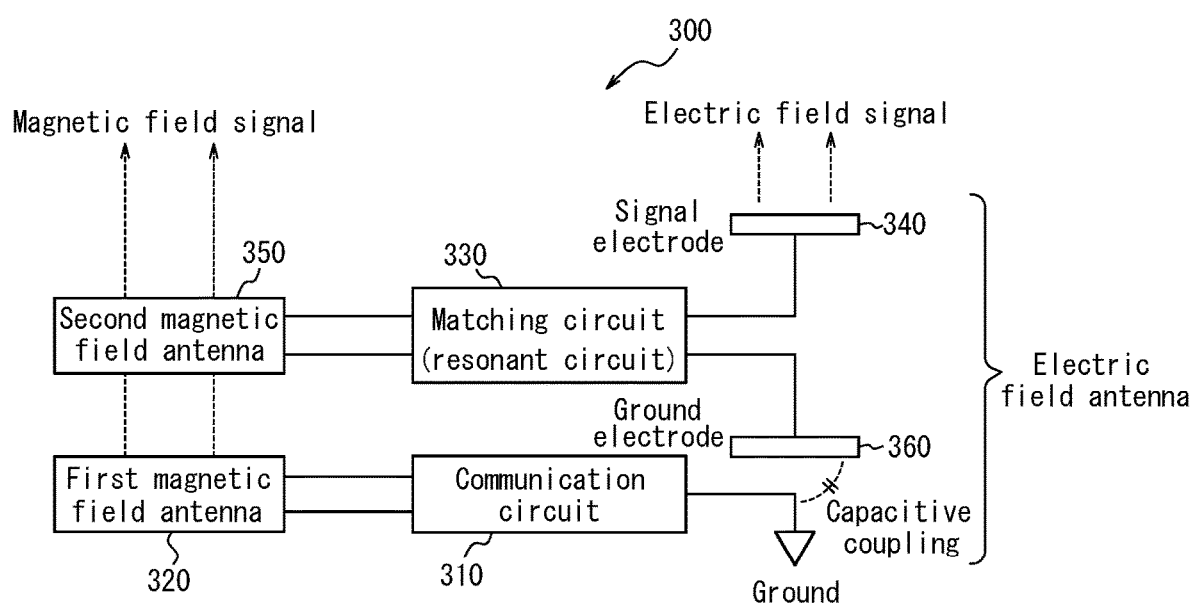
FIG. 5 is a functional block diagram illustrating the schematic configuration of a transmission device according to a third embodiment of the present disclosure.

FIG. 5 is a functional block diagram illustrating the schematic configuration of a transmission device 300 according to the third embodiment of the present disclosure. The transmission device 300 includes a communication circuit 310, a first magnetic field antenna 320, a matching circuit (resonant circuit) 330, a signal electrode 340, a second magnetic field antenna 350, and a ground electrode 360.

The transmission device 300 according to the present embodiment is configured by two independent transmission devices. One of the independent transmission devices (first transmission device) is a magnetic field transmission device that includes the communication circuit 310 and the first magnetic field antenna 320. The first transmission device is, for example, an existing magnetic field transmission device. The other independent transmission device (second transmission device) includes the matching circuit 330, the signal electrode 340, the second magnetic field antenna 350, and the ground electrode 360. In other words, the transmission device 300 according to the third embodiment is configured by combining the first transmission device and the second transmission device.

The transmission device 300 according to the present embodiment can perform magnetic field communication with a magnetic field communication device and electric field communication with an electric field communication device, like the transmission device 200 according to the second embodiment. A description of points similar to the transmission device 200 according to the second embodiment is omitted below as appropriate to focus mainly on the differences.

The communication circuit 310, the first magnetic field antenna 320, the matching circuit 330, the signal electrode 340, and the second magnetic field antenna 350 included in the transmission device 300 correspond respectively to the communication circuit 210, the first magnetic field antenna 220, the matching circuit 230, the signal electrode 240, and the second magnetic field antenna 250 included in the transmission device 200 according to the second embodiment. Hence, a detailed description thereof is omitted. The matching circuit 330 and the signal electrode 340 function as an electric field antenna in the present embodiment.

In the transmission device 300 according to the present embodiment, the matching circuit 330 is not connected to ground, unlike the transmission device 200 according to the second embodiment. The matching circuit 330 of the transmission device 300 is connected to the ground electrode 360 formed by a metal plate or the like. The ground electrode 360 is arranged near the ground to which the communication circuit 310 is connected. Here, near the ground refers to a position at which the ground electrode 360 is capable of capacitive coupling with the metal plate or the like forming the ground to which the communication circuit 310 is connected. In other words, the ground electrode 360 is connected to the ground by capacitive coupling. Consequently, the matching circuit 330 connected to the ground electrode 360 is substantially in a state of being connected to ground.

Like the transmission device 200 according to the second embodiment, the transmission device 300 according to the third embodiment can also transmit signals with the same content (data) simultaneously from both the first magnetic field antenna 320 and the electric field antenna (matching circuit 330 and signal electrode 340). Consequently, the user can freely choose between magnetic field communication and electric field communication.

Like the transmission device 200 according to the second embodiment, the transmission device 300 can also be configured by using an existing magnetic field communication system (first transmission device) and providing an electric field antenna (second transmission device) for electric field communication. Consequently, the transmission device 300 allows a reduction in the cost for producing devices as compared to when newly constructing a device with both the functions of known magnetic field communication and electric field communication. The transmission device 300 can also be used without the need to discard an existing magnetic field communication system. Furthermore, no wiring work for connecting the communication circuit 210 and the matching circuit 230 to existing equipment is required in the present embodiment, and the matching circuit 330 need not be connected to ground. The independent second transmission device can therefore be used in the present embodiment in combination with the first transmission device, which is existing equipment. Furthermore, the second transmission device can easily be attached to and detached from the first transmission device, since the second transmission device is configured independently from the first transmission device.

Fourth Embodiment

Figure 6:
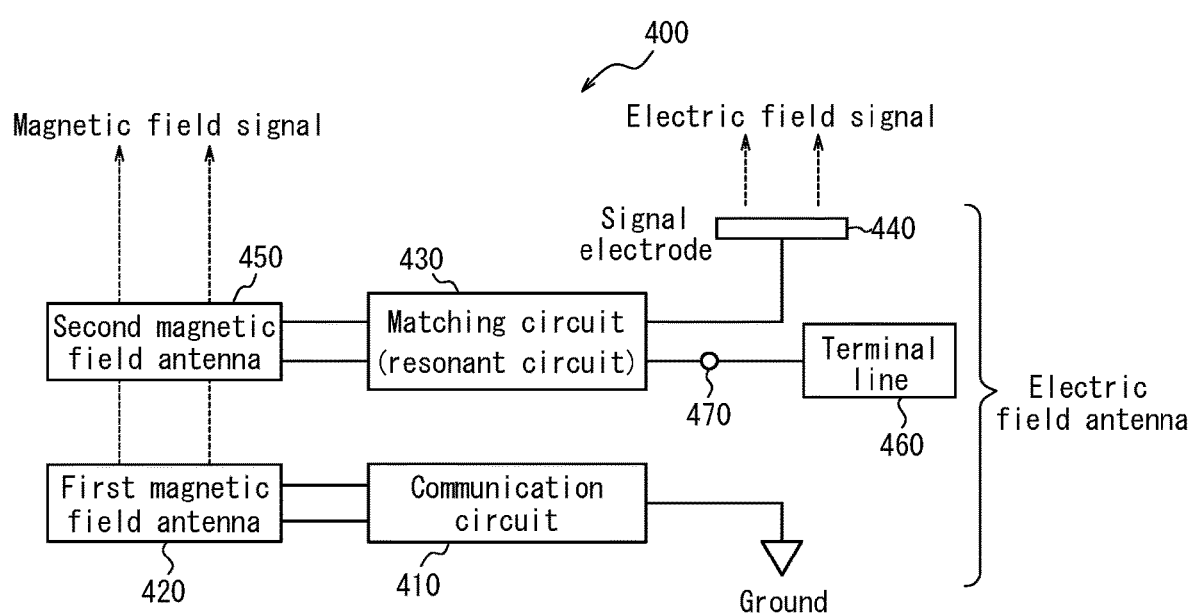
FIG. 6 is a functional block diagram illustrating the schematic configuration of a transmission device according to a fourth embodiment of the present disclosure.

FIG. 6 is a functional block diagram illustrating the schematic configuration of a transmission device 400 according to the fourth embodiment of the present disclosure. The transmission device 400 according to the fourth embodiment includes a communication circuit 410, a first magnetic field antenna 420, a matching circuit (resonant circuit) 430, a signal electrode 440, a second magnetic field antenna 450, and a connection terminal 470. The connection terminal 470 connects to the terminal line 460 when the transmission device 400 is used.

The transmission device 400 according to the present embodiment as well is configured by two independent transmission devices. One of the independent transmission devices (first transmission device) is a magnetic field transmission device that includes the communication circuit 410 and the first magnetic field antenna 420. The first transmission device is, for example, an existing magnetic field transmission device. The other independent transmission device (second transmission device) includes the matching circuit 430, the signal electrode 440, the second magnetic field antenna 450, and the connection terminal 470. The second transmission device may include a terminal line 460 connected to the connection terminal 470. The transmission device 400 according to the fourth embodiment is configured by the second transmission device being combined with the first transmission device.

The transmission device 400 according to the present embodiment differs from the transmission device 300 according to the third embodiment by including the terminal line 460 instead of the ground electrode 360. The matching circuit 430 and the signal electrode 440 function as an electric field antenna in the present embodiment.

The terminal line 460 is formed by a conductor, such as metal, or a dielectric and has an electrical length of nearly 90°. The terminal line 460 functions as a virtual ground by the above-described principle during electric field communication by the transmission device 400. Consequently, the matching circuit 430 is substantially in a state of being connected to ground in the transmission device 400 according to the present embodiment as well.

As with the transmission device 300 according to the third embodiment, the user can thus freely choose between magnetic field communication and electric field communication with the transmission device 400 according to the present embodiment. The transmission device 400 also allows a reduction in the cost for producing devices as compared to when newly constructing a device with both the functions of known magnetic field communication and electric field communication. Furthermore, the independent second transmission device can be used in the present embodiment in combination with the first transmission device, which is existing equipment. The second transmission device can also easily be attached to and detached from the first transmission device, since the second transmission device is configured independently from the first transmission device.

Fifth Embodiment

Figure 7:
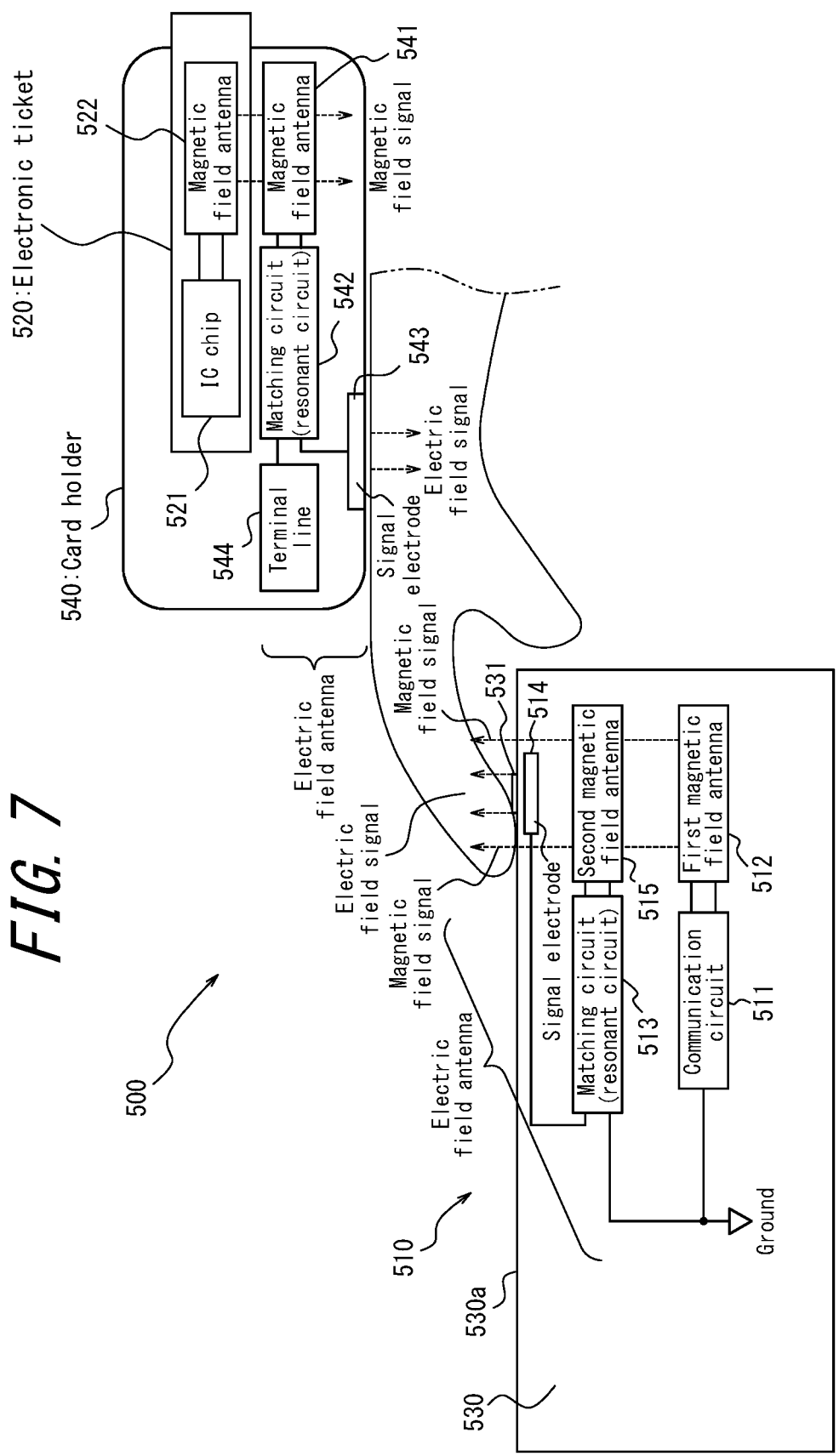
FIG. 7 is a functional block diagram illustrating the schematic configuration of a transmission system according to a fifth embodiment of the present disclosure.

FIG. 7 is a functional block diagram illustrating the schematic configuration of a transmission system 500 according to the fifth embodiment of the present disclosure. In the present embodiment, an example of communication using a transmission device 510 capable of selectively performing magnetic field communication and electric field communication, for example as described above in the first through fourth embodiments, is described. In the present embodiment, an example is described of a user using an electronic ticket 520 to communicate with the transmission device 510, which is configured as an automatic ticket gate 530. The electronic ticket 520 in the present embodiment is described as being a card-type magnetic field communication device (i.e. a contactless IC card). However, the electronic ticket 520 may have a different form other than a card.

In the present embodiment, the transmission device 510 includes a communication circuit 511, a first magnetic field antenna 512, a matching circuit (resonant circuit) 513, a signal electrode 514, and a second magnetic field antenna 515. The transmission device 510 according to the present embodiment is configured similarly to the transmission device 200 according to the second embodiment. Hence, a detailed description of each functional block in the transmission device 510 is omitted. Known equipment (a magnetic field transmission device) for achieving magnetic field communication may, for example, be used as the communication circuit 511 and the first magnetic field antenna 512 in the present embodiment. The matching circuit 513 and the signal electrode 514 function as an electric field antenna in the present embodiment.

In the transmission device 510 according to the present embodiment, the signal electrode 514 is arranged on a surface 530a, where communication takes place, of the automatic ticket gate 530 so that an electric field signal can be transmitted at the position where a magnetic field signal is generated by the first magnetic field antenna 512. A magnetic field signal and an electric field signal are therefore transmitted from the same position on the surface 530a of the automatic ticket gate 530. In the present disclosure, this position on the surface 530a is also referred to below as the "communication position". The automatic ticket gate 530 may include any display 531 on the surface 530a to indicate the communication position. This display allows the user to recognize the communication position in the automatic ticket gate 530 easily.

When a metal plate is present near the magnetic field antenna, as in the positional relationship between the first magnetic field antenna 512 and the signal electrode 514 in the present embodiment, then eddy current might flow in the metal plate, blocking transmission and reception of signals by the magnetic field antenna. The transmission device 510 may include any known means for preventing the occurrence of eddy current. For example, the signal electrode 514 may be shaped like a comb by forming slits in the signal electrode 514 to facilitate preventing the occurrence of eddy current in the transmission device 510.

The electronic ticket 520 includes an IC chip 521, which stores predetermined information and controls magnetic field communication processing in the electronic ticket 520, and a magnetic field antenna 522 capable of communicating with the transmission device 510 by magnetic field signals. To perform magnetic field communication in the transmission system 500, the user of the electronic ticket 520 passes the electronic ticket 520 over the communication position of the automatic ticket gate 530. Magnetic field communication between the transmission device 510 and the electronic ticket 520 is thus achieved on the basis of magnetic field signals transmitted from the first magnetic field antenna 512.

To perform electric field communication in the transmission system 500, the user of the electronic ticket 520 first inserts the electronic ticket 520 into a dedicated card holder 540, for example. The card holder 540 has an insertion portion (groove) configured to allow insertion and removal of the electronic ticket 520. The card holder 540 includes a magnetic field antenna 541, a matching circuit (resonant circuit) 542, a signal electrode 543, and a terminal line 544. The configuration of the magnetic field antenna 541, the matching circuit 542, the signal electrode 543, and the terminal line 544 in the card holder 540 is equivalent to that of the second magnetic field antenna 450, the matching circuit 430, the signal electrode 440, and the terminal line 460 of the transmission device 400 according to the fourth embodiment.

The magnetic field antenna 541 is arranged at a position in the card holder 540 allowing reception of magnetic field signals from the magnetic field antenna 522 of the electronic ticket 520 when the electronic ticket 520 is inserted in the insertion portion. The magnetic field antenna 541 is connected to the matching circuit 542. When a magnetic field signal transmitted by the magnetic field antenna 522 of the electronic ticket 520 is received in the magnetic field antenna 541 of the card holder 540, a control signal to be provided to the matching circuit 542 is generated in the magnetic field antenna 541 on the basis of the received magnetic field signal.

The functions of the matching circuit 542 and the signal electrode 543 are similar to those of the matching circuit 130 and the signal electrode 140 in the first embodiment, for example. In the present embodiment, the matching circuit 542 is connected to the terminal line 544. The terminal line 544 is formed by a conductor, such as metal, or a dielectric and has an electrical length of nearly 90°. The terminal line 544 functions as a virtual ground by the above-described principle during electric field communication in the transmission system 500.

The card holder 540 includes an attachment portion, such as a belt, allowing the user to attach the card holder 540 to the wrist, arm, or the like. The user attaches the card holder 540 by, for example, wrapping the attachment portion around the wrist or the arm. In the present embodiment, the user is described below as wrapping the attachment portion around the wrist. The signal electrode 543 is arranged in the card holder 540 at a position that comes in contact with the user (human body) when the user has the card holder 540 wrapped around the wrist. In other words, the signal electrode 543 is in a state of being electrically coupled to the user when the user has the card holder 540 wrapped around the wrist.

To achieve electric field communication in the transmission system 500, the user touches a portion of the body, such as a finger, to the communication position of the transmission device 510 while having the card holder 540, with the electronic ticket 520 inserted therein, wrapped around the wrist. The section of the human body, which is a dielectric, between the finger or the like that is in contact with the communication position and the location in contact with the signal electrode 543 functions at this time as a transmission medium. Through the human body that is coupled to the signal electrode 514 directly or by capacitive coupling, an electric field signal is transmitted to the card holder 540 at the signal electrode 543 coupled to the human body directly or by capacitive coupling. Electric field communication is thus achieved through the human body, which functions as a transmission medium, between the transmission device 510 and the card holder 540 with the electronic ticket 520 inserted therein.

In this way, the transmission system 500 according to the present embodiment allows the user to selectively communicate either by magnetic field communication or electric field communication. The user can easily select between magnetic field communication and electric field communication by inserting the electronic ticket 520 in the card holder 540. Furthermore, the user can use the electronic ticket 520 capable of magnetic field communication to perform electric field communication in the transmission system 500 by inserting the electronic ticket 520 in the card holder 540. In the case of the magnetic field communication system being an existing system, the transmission system 500 can thus achieve electric field communication using such existing assets.

Sixth Embodiment

Figure 8:
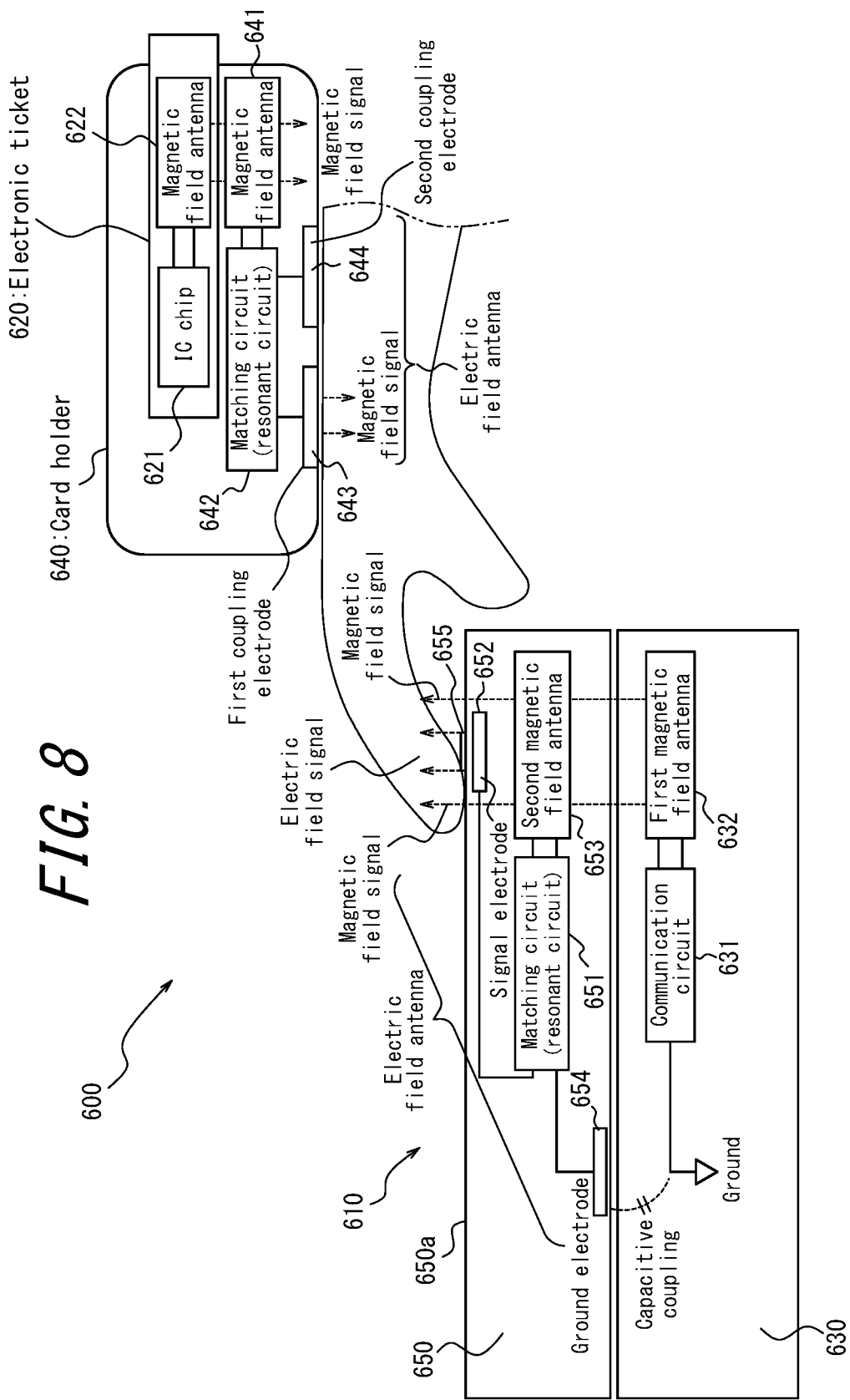
FIG. 8 is a functional block diagram illustrating the schematic configuration of a transmission system according to a sixth embodiment of the present disclosure.

FIG. 8 is a functional block diagram illustrating the schematic configuration of a transmission system 600 according to the sixth embodiment of the present disclosure. As in the transmission system 500 according to the fifth embodiment, the user can also selectively perform magnetic field communication and electric field communication in the transmission system 600 according to the present embodiment.

In the present embodiment, as in the case described in the fifth embodiment, an example is described of the user using an electronic ticket 620 to communicate with a transmission device 610, which is configured as an automatic ticket gate. In the present embodiment as well, the electronic ticket 620 is described as being a card-type magnetic field communication device.

The transmission device 610 according to the present embodiment is configured by two independent transmission devices, like the transmission device 300 according to the third embodiment, for example. One of the independent transmission devices (first transmission device 630) is, for example, an existing automatic ticket gate capable of magnetic field communication. The other independent transmission device (second transmission device 650) is configured to include an electric field antenna attachable to and detachable from the first transmission device 630.

The first transmission device 630 includes a communication circuit 631 and a first magnetic field antenna 632. The functions of the communication circuit 631 and the first magnetic field antenna 632 are similar to those of the communication circuit 310 and the first magnetic field antenna 320 in the third embodiment, for example. Hence, a detailed description thereof is omitted. In the present embodiment, the communication circuit 631 and the first magnetic field antenna 632 are, for example, known equipment (a magnetic field transmission device) for achieving magnetic field communication.

The second transmission device 650 includes a matching circuit (resonant circuit) 651, a signal electrode 652, a second magnetic field antenna 653, and a ground electrode 654. The functions of the matching circuit 651, the signal electrode 652, the second magnetic field antenna 653, and the ground electrode 654 are similar to those of the matching circuit 330, the signal electrode 340, the second magnetic field antenna 350, and the ground electrode 360 in the third embodiment, for example. In other words, the second magnetic field antenna 653 is arranged at a position allowing reception of magnetic field signals transmitted by the first magnetic field antenna 632 of the first transmission device 630 when the second transmission device 650 has been mounted on the first transmission device 630. The matching circuit 651 and the signal electrode 652 function as an electric field antenna in the present embodiment. The ground electrode 654 is arranged in a position at which, when the second transmission device 650 has been mounted on the first transmission device 630, the ground electrode 654 is capable of capacitive coupling with the ground to which the communication circuit 631 of the first transmission device 630 is connected.

The transmission device 610 in which the second transmission device 650 with the above-described configuration is mounted on the first transmission device 630 has a similar configuration to that of the transmission device 300 according to the third embodiment.

As in the transmission device 510 according to the fifth embodiment, the signal electrode 652 in the transmission device 610 according to the present embodiment is arranged on a surface 650a, where communication takes place, of the second transmission device 650 mounted on the first transmission device 630 so that an electric field signal can be transmitted at the position where a magnetic field signal is generated by the first magnetic field antenna 632. A magnetic field signal and an electric field signal are therefore transmitted from the same position on the surface 650a of the second transmission device 650. In the present embodiment, this position on the surface 650a corresponds to the "communication position". In the present embodiment as well, the second transmission device 650 may include any display 655 on the surface 650a to indicate the communication position.

The electronic ticket 620 in the present embodiment includes an IC chip 621 and a magnetic field antenna 622. The functions of the IC chip 621 and the magnetic field antenna 622 are similar to those of the IC chip 521 and the magnetic field antenna 522 included in the electronic ticket 520 of the fifth embodiment. Hence, a detailed description thereof is omitted.

In the transmission system 600 according to the present embodiment, magnetic field communication between the transmission device 610 and the electronic ticket is achieved by the same principle as described in the fifth embodiment by the user passing the electronic ticket 620 over the communication position of transmission device 610.

Like the card holder 540 in the fifth embodiment, the card holder 640 in the present embodiment includes an attachment portion, such as a belt, allowing the user to attach the card holder 640 to the wrist, arm, or the like.

The card holder 640 in the present embodiment includes a magnetic field antenna 641, a matching circuit (resonant circuit) 642, a first coupling electrode 643, and a second coupling electrode 644. In the card holder 640, the functions of the magnetic field antenna 641, the matching circuit 642, and the first coupling electrode 643 are similar to the functions of the magnetic field antenna 541, the matching circuit 542, and the signal electrode 543 of the card holder 540 in the fifth embodiment. Hence, a detailed description thereof is omitted.

The card holder 640 in the present embodiment differs from the card holder 540 in the fifth embodiment by not including the terminal line and by including the second coupling electrode 644. The second coupling electrode 644 is coupled to the matching circuit 642. The second coupling electrode 644 is arranged in the card holder 640 at a position that comes in contact with the user (human body) when the user has the card holder 640 wrapped around the wrist or the like. In other words, the second coupling electrode 644 is in a state of being electrically coupled to the user when the user has the card holder 640 wrapped around the wrist or the like. The first coupling electrode 643 and the second coupling electrode 644 are arranged in the card holder 640 at a position such that while the user has the card holder 640 wrapped around the wrist or the like, the portion of the human body that comes in contact with the first coupling electrode 643 (such as a fingertip) functions as a transmission medium for electric field communication with the transmission device 610, and the portion of the human body that comes in contact with the second coupling electrode 644 (the entire body excluding the portion from the wrist where the card holder is attached towards the distal side) functions as a terminal line.

Figure 9:
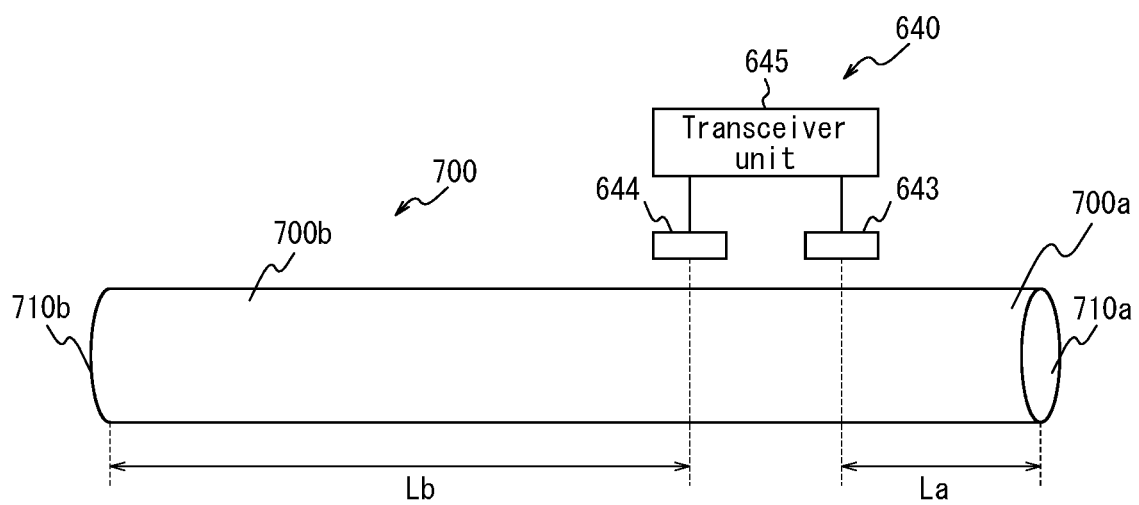
FIG. 9 schematically illustrates the state in which a card holder is coupled to a dielectric.

Here, the principle by which the human body functions as a transmission medium and a terminal line is described. FIG. 9 schematically illustrates the state in which the card holder 640 is coupled to a dielectric 700. In FIG. 9, the dielectric 700 is illustrated schematically as being cylindrical. Furthermore, FIG. 9 illustrates the functional components that transmit and receive high frequency power collectively as a transceiver unit 645 in the card holder 640 with the electronic ticket 620 inserted therein.

As illustrated in FIG. 9, the cylindrical dielectric 700 has a first bottom (first end) 710a and a second bottom (second end) 710b. The height of the cylindrical dielectric 700 is greater than the diameter of the bottoms (the first bottom 710a and second bottom 710b) of the dielectric 700. The height direction of the cylinder is also referred to as the longitudinal direction.

The card holder 640 couples to the dielectric 700 so that the first coupling electrode 643 and the second coupling electrode 644 are side-by-side in the longitudinal direction of the dielectric 700. Here, it is assumed that the first coupling electrode 643 is coupled to be closer to the first bottom 710a, and the second coupling electrode 644 is coupled to be closer to the second bottom 710b.

In the dielectric 700 to which the card holder 640 is coupled, the region from the position at which the first coupling electrode 643 is coupled towards the first bottom 710a is referred to as a first region 700a, and the region from the position at which the second coupling electrode 644 is coupled towards the second bottom 710b is referred to as a second region 700b. The height of the first region 700a (the length in the longitudinal direction) is referred to as La, and the height of the second region 700b as Lb. By the user coupling the first coupling electrode 643 and the second coupling electrode 644 of the card holder 640 to the dielectric 700 at the below-described predetermined positions, the first region 700a functions as a transmission medium, and the second region 700b functions as a terminal line.

Figure 10:
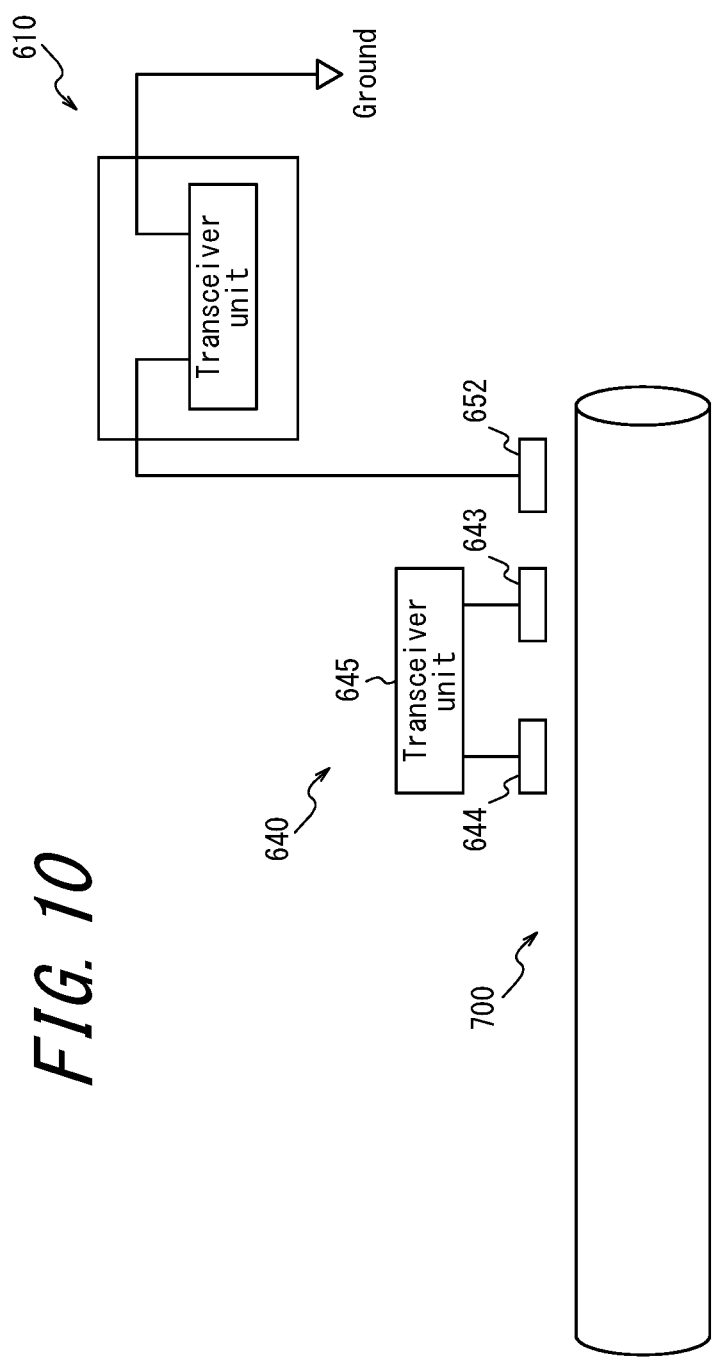
FIG. 10 schematically illustrates an example of a coupled state allowing electric field communication to be established between a card holder and a transmission device.

Here, the predetermined positions for the first region 700a to function as a transmission medium and the second region 700b to function as a terminal line are described. The card holder 640 is coupled to a position on the dielectric 700 such that the length Lb is an electrical length of $((2n+1)\times 90)°$. When the length Lb is an electrical length of $((2n+1)\times 90)°$, a transmission system capable of electric field communication is established by the card holder 640, the dielectric 700, and the transmission device 610 upon the first region 700a coupling with the schematically illustrated signal electrode 652 of the transmission device 610, as illustrated in FIG. 10. In this case, by the principle explained with reference to FIG. 2, a standing wave is generated with a maximum voltage amplitude and zero current amplitude at the second bottom 710b of the second region 700b and zero voltage amplitude and maximum current amplitude at the end of the second region 700b where the second coupling electrode 644 is coupled. From the transceiver unit 645, current thus flows towards the second region 700b of the dielectric 700 through the second coupling electrode 644, and current flows towards the first region 700a through the first coupling electrode 643. Consequently, the card holder 640 can communicate with the transmission device 610 using the first region 700a as a transmission medium. In this way, the second region 700b functions as the terminal line 170 illustrated in FIG. 2.

As explained with reference to FIG. 2, a certain advantage in high frequency transmission is still obtained when the electrical length of the terminal line 170 is within a range of ±45° of 90°, i.e. when the phase of the reflected wave is greater than 90° and smaller than 270°. Therefore, coupling at a position such that the length Lb becomes an electrical length in a range of $((2n+1)\times 90\pm 45)°$ is sufficient for the second region 700b to function as a terminal line.

Figure 11:
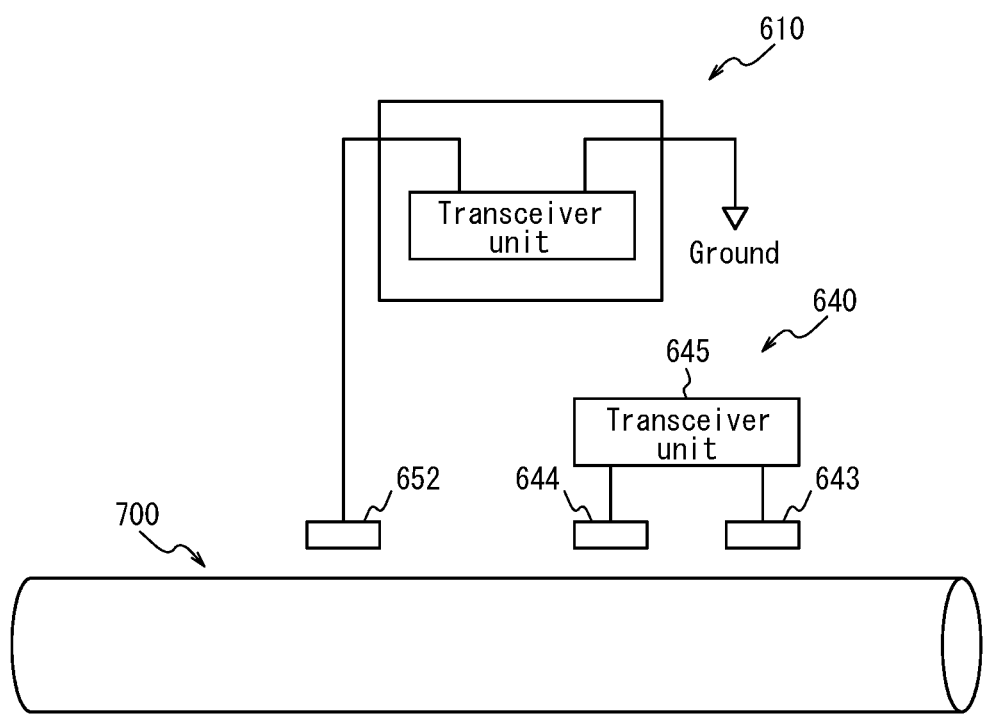
FIG. 11 schematically illustrates an example of a coupled state in which electric field communication is not established between a card holder and a transmission device.

The card holder 640 is coupled to a position on the dielectric 700 such that the length La is an electrical length of $(2n\times 90)°$. If the length La were also an electrical length of $((2n+1)\times 90)°$ like the length Lb, then the first region 700a would function as a terminal line and the second region 700b would function as a transmission medium upon the second region 700b coupling with the signal electrode 652 of the transmission device 610, as illustrated in FIG. 11. In other words, in this configuration, either the first region 700a or the second region 700b can function as a terminal line.

However, when the transmission device 100 is coupled to the dielectric 700 at a position such that the length La of the first region 700a is an electrical length of $(2n\times 90)°$, the standing wave illustrated in FIG. 2 is not generated at the end on the side where the first coupling electrode 643 of the first region 700a is coupled. Consequently, the first region 700a does not function as the terminal line 170, and no virtual ground is formed, even if the second region 700b couples to the signal electrode 652 of the transmission device 610, as illustrated in FIG. 11. This prevents the establishment of communication between the card holder 640 and the transmission device 610.

In this way, when the card holder 640 is coupled at a position such that the length La of the first region 700a is an electrical length of $(2n\times 90)°$ and the length Lb of the second region 700b is an electrical length of $(2(n+1)\times 90)°$, the second region 700b of the dielectric 700 functions as a terminal line, whereas the first region 700a of the dielectric 700 does not function as a terminal line. Hence, the card holder 640 establishes communication when the signal electrode 652 of the transmission device 610 is coupled to the first region 700a but does not establish communication when the signal electrode 652 is coupled to the second region 700b.

In this way, by coupling the card holder 640 to a predetermined position of the dielectric 700, a region allowing establishment of communication and a region not allowing establishment of communication upon coupling with the signal electrode 652 can be formed in the dielectric 700. In other words, the region allowing establishment of communication in the dielectric 700 can be restricted in this way. Consequently, the region allowing establishment of communication can be restricted when the card holder 640 is coupled at the predetermined position on the dielectric 700, reducing the likelihood of unintended communication and facilitating prevention of unintended information leaks. The card holder 640 in the present embodiment improves safety with respect to this point.

It suffices for the card holder 640 to be coupled at a position where the length La of the first region 700a is such that no standing wave is generated in the first region 700a. It thus suffices for the card holder 640 to be coupled at a position such that the length La is an electrical length in a range of $(2n \times 90 \pm 45)°$.

Figure 12:
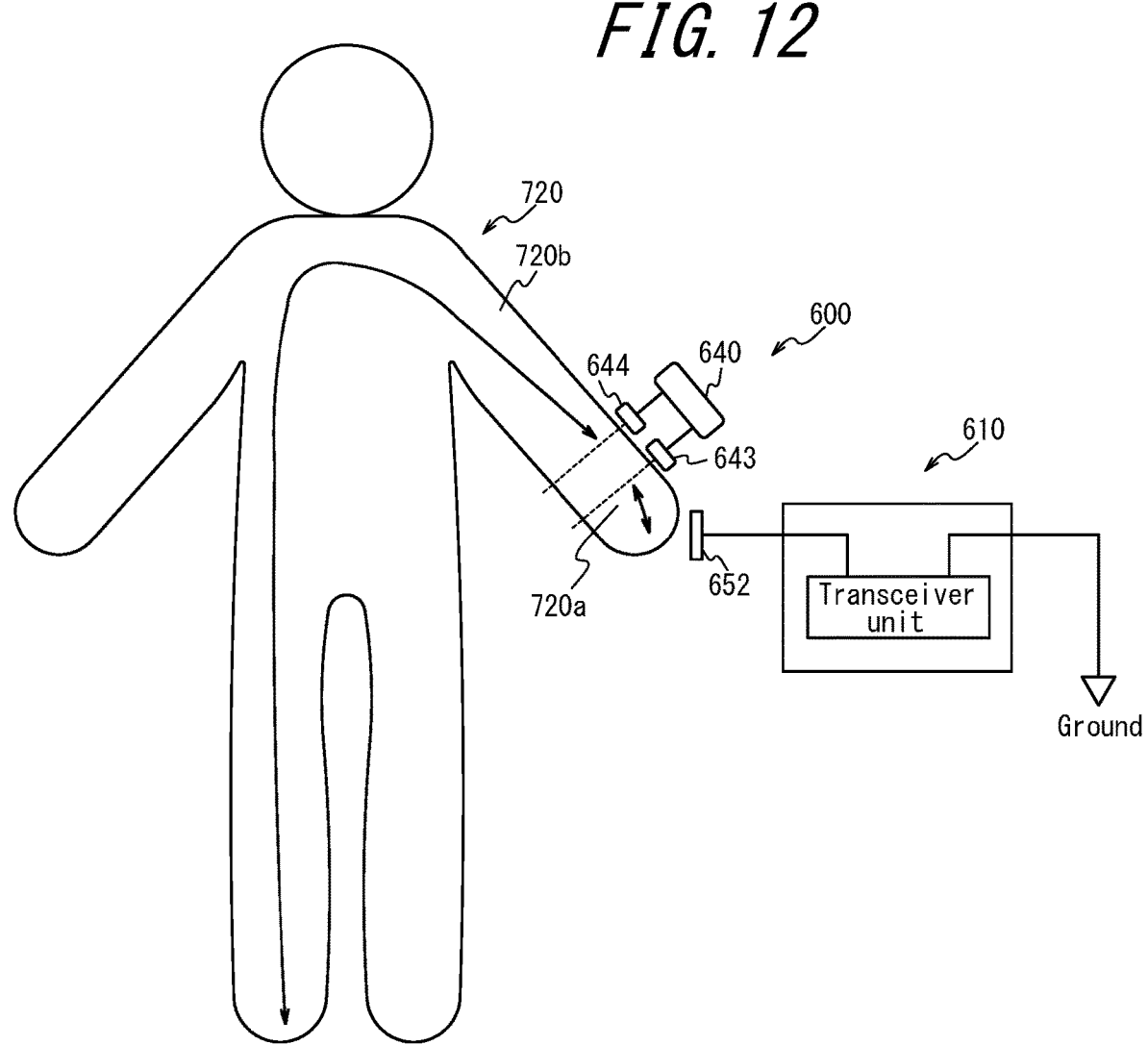
FIG. 12 schematically illustrates an example of a transmission system configured by coupling a card holder to a human body.

FIG. 12 illustrates an example transmission system 600 configured by coupling the card holder 640 of FIG. 8 to a human body 720, which is a dielectric. As illustrated in FIG. 12, the first coupling electrode 643 and the second coupling electrode 644 are coupled to the human body 720 by the card holder 640 being attached to the finger, arm, or the like of a human body, for example. At this time, the first coupling electrode 643 and the second coupling electrode 644 couple to the human body 720 so as to be side-by-side in a direction from the torso side towards the distal side of the arm. For example, the card holder 640 may be formed as a wristband, an armband, or the like so as to be attachable to the wrist, the arm, or other body part when the card holder 640 is coupled to the human body 720.

When the card holder 640 is coupled to the human body 720, the card holder 640 uses an electric field signal of a predetermined frequency so that the region from the first coupling electrode 643 coupled on the distal side to the end (for example, the fingertip) becomes the first region 700a illustrated in FIG. 9, and the region from the second coupling electrode 644 on the torso side to the entire arm, torso, and leg becomes the second region 700b illustrated in FIG. 9. The predetermined frequency may, for example, be 13.56 MHz. When the frequency of the electric field signal is 13.56 MHz, then coupling the second coupling electrode 644 to the human body 720, which is a dielectric, on the torso side near a wrist yields an electrical length of approximately 90° as the length of the second region and an electrical length of less than 45° as the length of the first region, supposing that the human body 720 is a typical adult height (such as 170 cm). Hereinafter, the frequency of the signal used by the card holder 640 is assumed to be 13.56 MHz. Furthermore, the region from the first coupling electrode 643 on the distal side to the end (for example, the fingertip) is referred to as the distal side 720a of the human body 720, and the region from the second coupling electrode 644 on the torso side to the entire arm, torso, and leg is referred to as the torso side 720b of the human body 720.

When a fingertip, for example, of the human body 720 to which the card holder 640 is attached comes into contact with the communication position of the transmission device 610, then a standing wave is generated on the torso side 720b of the human body 720, forming a virtual ground. In other words, the torso side 720b functions as a terminal line. The distal side 720a functions as a transmission medium. Electric field communication is thus achieved through the human body 720, which functions as a transmission medium, between the transmission device 610 and the card holder 640 with the electronic ticket 620 inserted therein. The transmission device 610 in the present embodiment may be any of the transmission devices 100 to 400 in the first through fourth embodiments.

In the present embodiment, the distal side 720a does not function as a terminal line, and hence communication is not established, when the torso side 720b of the human body 720 to which the card holder 640 is attached couples to the signal electrode 652. In other words, the transmission system 600 according to the present embodiment allows electric field communication while reducing the likelihood of unintended communication, thereby facilitating prevention of unintended information leaks and improving safety.

In this way, the transmission system 600 according to the present embodiment allows the user to selectively communicate either by magnetic field communication or electric field communication. The user can easily select between magnetic field communication and electric field communication by inserting the electronic ticket 620 in the card holder 640. Furthermore, the user can use the electronic ticket 620 capable of magnetic field communication to perform electric field communication in the transmission system 600 by inserting the electronic ticket 620 in the card holder 640. In the case of the magnetic field communication system being an existing system, the transmission system 600 can thus achieve electric field communication using such an existing asset.

Furthermore, in the transmission system 600 according to the present embodiment, the transmission device 610 can be configured by attaching the second transmission device 650 to an existing first transmission device 630. This allows the transmission device 610 to be configured easily, without the need to change the configuration of the existing first transmission device 630.

In the sixth embodiment, the case of the first coupling electrode 643 of the card holder 640 being coupled to the terminal side 720a of the human body 720 and the second coupling electrode 644 being coupled to the torso side 720b has been described. Electric field communication is also established in the transmission system 600, however, when the second coupling electrode 644 is coupled to the terminal side 720a and the first coupling electrode 643 is coupled to the torso side 720b. In this case, the above-described functions of the first coupling electrode 643 and the second coupling electrode 644 are switched, with the portion on the distal side of the second coupling electrode 644 functioning as a transmission medium and the portion on the torso side of the first coupling electrode 643 functioning as a terminal line.

In the fifth and sixth embodiments, the electric field communication device that the user uses for electric field communication has been described as being a card holder into which an electronic ticket, which is a magnetic field communication device, can be inserted. The electric field communication device is not, however, limited to this example. The user may perform electric field communication using a dedicated electric field communication device configured to be attachable to a human body, such as a wristband or armband.

Embodiments of the present disclosure have been described in detail. A person of ordinary skill in the art, however, could make modifications or substitutions to the above embodiments without departing from the scope of the present disclosure. In other words, the present disclosure is not limited to the above embodiments, and a variety of modifications and changes are possible. For example, the functions and the like included in the various components may be reordered in any logically consistent way. Furthermore, components may be combined into one or divided.

The matter disclosed in the present disclosure is not intended to be all-encompassing. That is, the present disclosure does not deny the existence of subject matter not claimed in the present disclosure, i.e. the existence of subject matter of a later divisional application or subject matter to be added by amendment.

The present disclosure includes examples for the purpose of illustration but is not to be considered limited by the content of such examples.

REFERENCE SIGNS LIST 100, 200, 300, 400, 510, 610 Transmission device
110, 210, 310, 410, 511, 631 Communication circuit
120, 522, 541, 622, 641 Magnetic field antenna
130, 230, 330, 430, 513, 542, 642, 651 Matching circuit
140, 240, 340, 440, 514, 543, 652 Signal electrode
150 Electric field communication device
151 Transceiver
152a, 152b Input/output terminal
160 Transmission medium
170, 460, 544 Terminal line
170a, 170b End
220, 320, 420, 512, 632 First magnetic field antenna
250, 350, 450, 515, 653 Second magnetic field antenna
360, 654 Ground electrode
470 Connection terminal
500, 600 Transmission system
520, 620 Electronic ticket
521, 621 IC chip
530 Automatic ticket gate
530a, 650a Surface
531, 655 Display
540, 640 Card holder
630 First transmission device
643 First coupling electrode
644 Second coupling electrode
645 Transceiver unit
650 Second transmission device
700 Dielectric
700a First region
700b Second region
710a First bottom
710b Second bottom
720 Human body
720a Distal side
720b Torso side

The invention claimed is:

1. A transmission device comprising:
a magnetic field antenna; and
an electric field antenna connected electrically to the magnetic field antenna;
wherein when the magnetic field antenna is at a position allowing reception of a magnetic field signal transmitted by another magnetic field antenna included in a magnetic field transmission device, the transmission device becomes capable of transmitting an electric field signal generated on the basis of the magnetic field signal; and
wherein the electric field antenna is grounded by being connected electrically to a terminal line having an electrical length of $((2n+1)\times 90\pm 45)°$, where n is an integer of at least 0, relative to the electric field signal.

2. The transmission device of claim 1, wherein the transmission device is configured to be attachable to and detachable from the magnetic field transmission device.

3. A transmission system comprising:
an electric field antenna connected electrically to a magnetic field antenna;
a magnetic field transmission device comprising a communication circuit, configured to control a signal to be transmitted, and another magnetic field antenna connected electrically to the communication circuit; and
an electric field communication device comprising a transceiver unit configured to transmit and receive an electrical signal and a coupling electrode connected to the transceiver unit and configured to couple to a transmission medium;
wherein the electric field communication device performs electric field communication through the transmission medium when the transmission medium is coupled to the electric field antenna and the coupling electrode while the magnetic field antenna is at a position allowing reception of a magnetic field signal transmitted by the another magnetic field antenna;
wherein the electric field antenna is configured to be attachable to and detachable from the magnetic field transmission device;
wherein the electric field communication device further comprises another coupling electrode; and
wherein a length from the coupling electrode to an end of the transmission medium in a longitudinal direction is an electrical length in a range of $(2n\times 90\pm 45)°$, where n is an integer of at least 0, relative to the electrical signal, a length from the another coupling electrode to another end of the transmission medium in the longitudinal direction is an electrical length in a range of $((2n+1)\times 90\pm 45)°$ relative to the electrical signal, and the electric field communication device performs the electric field communication by the electric field antenna coupling to a region of the transmission medium where the electrical length is in the range of $(2n\times 90\pm 45)°$ relative to the electrical signal.

4. The transmission system of claim 3, wherein the electric field communication device further comprises:
an insertion portion allowing insertion of a magnetic field communication device comprising a magnetic field antenna; and
a magnetic field antenna configured to receive a magnetic field signal transmitted by the magnetic field antenna of the magnetic field communication device.

* * * * *